United States Patent [19]

Giuliano

[11] Patent Number: 4,779,519
[45] Date of Patent: Oct. 25, 1988

[54] EMULSIFIER ASSEMBLY FOR EMULSIFYING AIR, STEAM, AND MILK IN PREPARING CAPPUCCINO AND THE LIKE BEVERAGES, PARTICULARLY FOR USE WITH BAR-SIZE MAKERS

[75] Inventor: Mario Giuliano, Cuneo, Italy
[73] Assignee: Nuova Faema S.p.A., Milan, Italy
[21] Appl. No.: 39,622
[22] Filed: Apr. 16, 1987
[51] Int. Cl.⁴ .................. B01F 13/02; B01F 15/02
[52] U.S. Cl. ..................... 99/275; 137/889; 137/893; 366/163
[58] Field of Search ............... 49/275, 279, 323.1, 49/323.3, 452, 453, 454; 366/139, 150, 163; 137/888, 889, 893

[56] References Cited
U.S. PATENT DOCUMENTS
3,188,055 6/1965 Lutjens .................. 366/163
3,854,700 12/1974 MacManus ............... 366/163
4,715,274 12/1987 Paoletti .................. 99/323.1

Primary Examiner—Robert W. Jenkins
Attorney, Agent, or Firm—Angelo Notaro

[57] ABSTRACT

An emulsifier assembly for emulsifying air, steam, and milk in preparing cappuccino and like beverages, particularly for use with bar-size espresso coffee makers, being also adapted for heating up milk in preparing café au lait, comprises a body, a steam delivery channel opening into a suction chamber of the body, an air intake line and a milk intake line. Both lines are in communication with the suction chamber, and a flow rate adjuster is connected in the air intake line. A before shutter member is opertive in the air intake line, and a restrictor member is operative in an end section of the milk intake line. Both of these members are hand-actuatable.

5 Claims, 1 Drawing Sheet

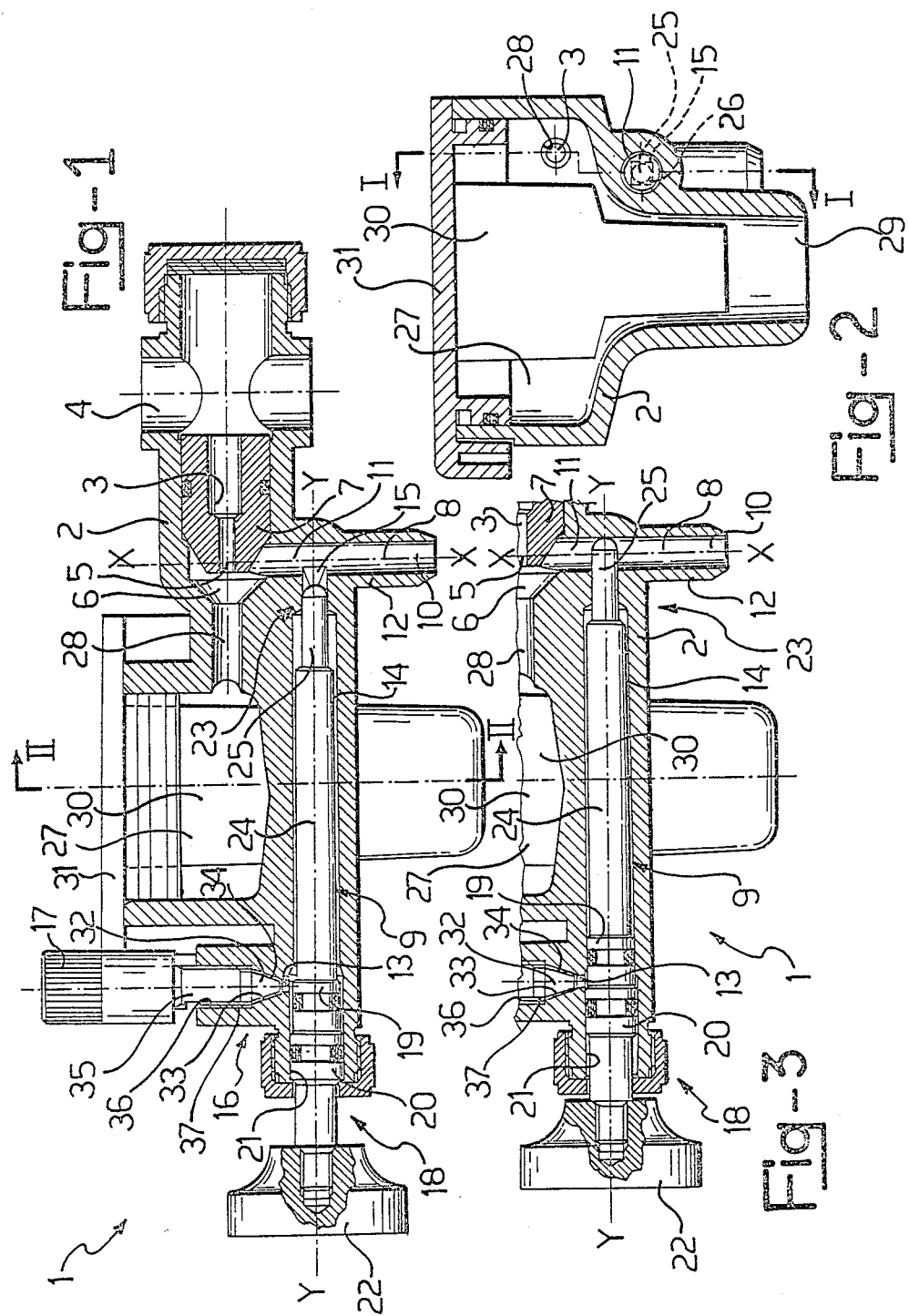

EMULSIFIER ASSEMBLY FOR EMULSIFYING AIR, STEAM, AND MILK IN PREPARING CAPPUCCINO AND THE LIKE BEVERAGES, PARTICULARLY FOR USE WITH BAR-SIZE MAKERS

DESCRIPTION

This invention relates to an emulsifier assembly for emulsifying air, steam, and milk in the preparation of cappuccino and the like beverages, particularly for use with bar-size espresso coffee makers and being of a type which comprises a body, a steam delivery channel open to a suction chamber, an air intake line and a milk intake line, with both lines in communication with the suction chamber, and a flow rate adjuster connected in the air intake line.

With bar-size espresso coffee makers, an emulsifier assembly of the type specified above is in many ways advantageous when used to emulsify air, milk, and steam in order to produce a desired emulsion for admixing to espresso coffee percolate in the preparation of a cappuccino beverage. It is instead disadvantageous where used to heat up milk, e.g. in the preparation of café au lait, which is a beverage comprising hot milk and espresso coffee.

In the latter instance, by manipulating the air flow rate adjuster, the air passage is shut off such that the assembly will only deliver milk as heated by the steam. Shutting off the air results, however, in a richer intake of milk by the steam, and accordingly, in a milder transfer of heat thereto. Thus, milk generally fails to reach the desired temperature. This will require additional heating of the milk being delivered by holding it under the steam nozzle which equips an espresso coffee maker for preparing hot punch drinks and the like.

It is the object of this invention to provide an emulsifier assembly of the type specified above, which affords such constructional and operational features as to obviate the cited disadvantage.

This object is achieved by an emulsifier assembly as indicated being characterized in that it comprises a shutter member operative in the air intake line and a restrictor member operative in an end section of the milk intake line, both members being actuatable by hand.

Further features and advantages of the emulsifier assembly according to the invention will be apparent from the following detailed description of a preferred embodiment thereof, given by way of illustration and not of limitation with reference to the accompanying drawings, where:

FIG. 1 is a sectional view of an emulsifier assembly according to the invention, taken along the line I—I of FIG. 2;

FIG. 2 is a sectional view through the emulsifier assembly of FIG. 1, taken along the line II—II; and FIG. 3 is a sectional view through a detail of the emulsifier assembly of FIG. 1, as taken at a different stage of its operation.

With reference to the drawing figures, the numeral 1 genrally designates an emulsifier assembly adapted for installation on a bar-size espresso coffee maker, not shown in the drawing, and being effective to emulsify air, steam, and milk in the preparation of cappuccinos and the like.

Specifically, the assembly 1 comprises a body 2, which is intended for cantilever mounting on the end of a steam delivery pipe from the espresso coffee maker, again not shown in the drawing.

Formed in the body 2 is a steam delivery channel 3 which extends between an inlet 4 connected to said steam delivery pipe and an outlet 5 whereby it opens into a suction chamber 6.

The end section of the steam delivery channel 3 runs inside a diffuser 7 mounted snuggle in the body 2 and having progressively decreasing passage section areas toward the outlet 5. Diffuser 7 functions as an ejector nozzle.

Formed in the body 2 are a milk intake line 8 and an air intake line 9, which lines communicate with the suction chamber 6.

More specifically, the milk intake line 8 lies along an axis X—X and has a start section 10 and an end section 11. The start section 10 extends along a tubular projection 12 from the body 2 which is adapted for connection to a hose pipe dipping into a milk reservoir, not shown in the drawing. The end section 11 extends through the body 2 and opens into the suction chamber 6.

The air intake line 9 has a first section 13 which extends along a parallel direction to the axis X—X, and a second section 14 which extends along a perpendicular direction Y—Y to the axis X—X and opens into the end section 11 of the milk intake line 8, and hence, the suction chamber 6 itself.

In particular, the second section 14 of the air intake line 9 opens into the end section 11 of the milk intake line 8 through a port 15 which has a preset square cross-sectioned shape.

Connected in the air intake line 9, at the first section 13 thereof, is an adjuster 16 effective to adjust the air flow rate and being operable manually through a knurled knob 17.

In the air intake line 9 there is inserted, intermediate to the first section 13 and the second section 14, a shutter or valve member generally indicated at 18. The shutter member 18 is embodied by a stopper 19 which is rigidly connected to a slider 20. The slider 20 is mounted for guided movement in a seat 21 formed in the body 2 as a continuation of the second section 14 of the line 9 where the first section 13 merges with the second section 14. The whole formed by the slider 20 and the stopper 19 is shiftable manually, by operation of a knob 22 attached to the slider and accessible from the outside, between a first, engaged position where the stopper 19 is operative in the second section 14 of the air intake line 9 to shut off the air flow, and a second, disengaged position where the stopper 19 is disengaged from said line section 14 to allow the passage of air therethrough.

The assembly 1 of this invention also comprises a restrictor member, generally indicated at 23, which is operable manually and located in the end section 11 of the milk intake line 8.

The restrictor member 23 is advantageously embodied by a cylindrical tip 24 formed coaxially integral with the stopper 19 as a continuation thereof and extending through the second section 14 centrally thereof. The tip 24 has an active end section 25 with a circular cross-sectioned shape and extends through the square cross-sectional port 15.

Thus, there is formed between the active section 25 and the port 15 an interspace 26 through which the air is allowed to flow.

In conformity with a displacement of the slider 20 and the stopper 19, the active section 25 of the tip 24 is shiftable between an operating position where the active section 25 will juts into the end section 11 of the milk intake line 8 and an inoperative position where said active section 25 will be retracted into the port 15.

It should be noted that with the active section 25 in its operative position jutting out into the end section 11, it will throttle down the cross-sectional area of the latter and restrict the milk flow.

Also formed in the body 2 is a cylindrical emulsion chamber 27 which is connected to the suction chamber 6 via a line 28, and communicates with the outside via a dispensing outlet 29.

The line 28 extends aligned to the steam delivery channel 3 and opens into the emulsion chamber 27 tangetially thereof. The dispensing outlet 29 is located at the center of the emulsion chamber 27 and opens downwardly.

Indicated at 30 is a sheet-like partition extending within the emulsion chamber 27 transversely therein and jutting out of a lid 31 which is attached sealingly to the body 2 and delimits the top of the emulsion chamber 27.

It should be noted that the intake air flow rate adjuster 16, placed in the first section 13 of the air intake line 9, comprises a pin member 32 of conical shape which is mounted in the body 2 for micrometric displacement toward and away from a seat 33 formed in the body 2, said seat 33 having a conical shape to match the pin member 32.

The pin member 32 and the seat 33 define, along the first section 13, a narrowing cross-sectional area 34 for the airflow which can be adjusted as required.

In particular, the pin member 32 is formed integrally with the end of a micrometric screw 35, in thread engagement in the body 2. The micrometric screw 35 is in turn formed integrally with the knurled knob 17.

Advantageously, the first section 13 has a portion 36, in communication with both the outside and the narrowing section 34, which is formed in a groove 37 extending lengthwise on the micrometric screw 35.

The operation of the emulsifying assembly according to the invention will be described hereinbelow with reference to a starting condition, depicted in FIG. 1, whereby the shutter or valve member 18 and restrictor member 23 are both in their inoperative positions.

In that condition, steam would flow through the delivery channel 3 into the emulsion chamber 27, generating a vacuum in the chamber 6. In the meantime, there is drawn into the suction chamber 6 over the line 8 a set amount of milk, a set amount of air being drawn in over the line 9. In particular, the proper air flow rate value would be selected by manipulating the adjuster 16.

It should be noted that at the port 15, the air would flow through the interspace 26 formed between the port 15 and the active section 25 of the flow restrictor 23.

In this operating condition, the dispensing outlet 29 will dispense an air-milk-steam emulsion.

Where hot milk is to be dispensed, e.g. to prepare café au lait or for straight consumption, it will be sufficient to operate the knob 22 so as to move the shutter member 18 and restrictor member 23 to their operating positions.

In this newly introduced condition, shown in FIG. 3, the steam issuing from the delivery channel 3 into the suction chamber 6 will draw from the line 8 milk at a lower flow rate, thereby heating it to an adequate extent.

The emulsifier assembly 1 can be easily restored to its starting condition of FIG. 1 by again operating the knob 22 in a direction to return both the shutter member 18 and the restrictor member 23 to their position shown in FIG. 1.

In that condition, which reiterates the starting condition, the emulsifier assembly 1 is ready to dispense a fresh air-milk-steam emulsion for preparing cappuccino. It should be noted that on freshly dispensing an air-milk-steam emulsion, the active section 25 of this restrictor member 23 will be cleared of any milk residue left therein by the air flowing into the interspace 26.

A primary advantage of the emulsifier assembly according to the invention is that it can dispense large amounts of hot milk heated to an adequate temperature.

A further advantage of the inventive emulsifier assembly is that it can operate quite satisfactorily from the sanitary standpoint and the standpoint of its long term reliability of operation, while preventing formation of milk deposits over the restrictor member.

A not negligible advantage of the this emulsifier assembly is that it can be easy to handle and quick to operate.

Furthermore, it is made up of a limited number of easily disassembled parts, which greatly simplifies periodical cleaning thereof.

Lastly, the emulsifier assembly of this invention can be readily switched from its cappuccino mode of operation to the hot milk dispensing mode merely by a single operation of the control knob for the shutter and restrictor members, without altering the air flow rate setting made by means of its adjuster.

Understandably, a skilled person in the art may, in order to meet specific contingent requirements, apply a number of modifications and changes to the emulsifier assembly as described hereinabove within the scope of the invention as set forth in the appended claims.

I claim:

1. An emulsifier assembly for emulsifying air, steam and milk in preparing capuccino and like beverages, particularly for use with bar-size espresso coffee-makers, comprising: a body defining a suction chamber, a steam delivery channel opening into said suction chamber, an air intake line in communication with said suction chamber and a milk intake line in communication with said suction chamber and having an end section in communication with said air intake line; a flow rate adjustor operatively connected to said air intake line for adjusting the rate of air flow to said air intake line; a vlave member mounted for movement in said air intake line for opening and closing the flow of air in said air intake line; and a restrictor member mounted for movement into said end section of said milk intake line for restricting the flow of milk through said milk intake line when said valve member is moved to close the flow of air in said air intake line, both said members being moveable by hand.

2. An emulsifier assembly according to claim 1, wherein said body defines a port between said air intake line and said end section of said milk intake line, said port having a selected cross-secitonal shape, said restrictor member being nmounted for movement into said port and having a cross-sectional shape which is different from that of said port for permitting a restricted flow of air between said port and said restrictor member.

3. An emulsifier assembly according to claim 2, wherein in that said restrictor member is linked mechanically with the valve member for movement of said restrictor member with movement of said valve member.

4. An emulsifier assembly according to claim 3, characterized in that said restrictor member is formed integrally with the valve member.

5. An emulsifier assembly according to claim 4, characterized in that said air flow rate adjuster includes a pin member shiftable micrometrically toward and away from a matching seat formed in the body.

* * * * *

UNITED STATES PATENT AND TRADEMARK OFFICE
CERTIFICATE OF CORRECTION

PATENT NO. : 4,779,519

DATED : October 25, 1988

INVENTOR(S) : Mario Giuliano

It is certified that error appears in the above-identified patent and that said Letters Patent is hereby corrected as shown below:

On the title page Insert

-- (30) Foreign Application Priority Data
April 18, 1986 (IT) Italian....21589B/86 --.

Signed and Sealed this

Twenty-fifth Day of April, 1989

Attest:

DONALD J. QUIGG

*Attesting Officer*   Commissioner of Patents and Trademarks